Figure 1:
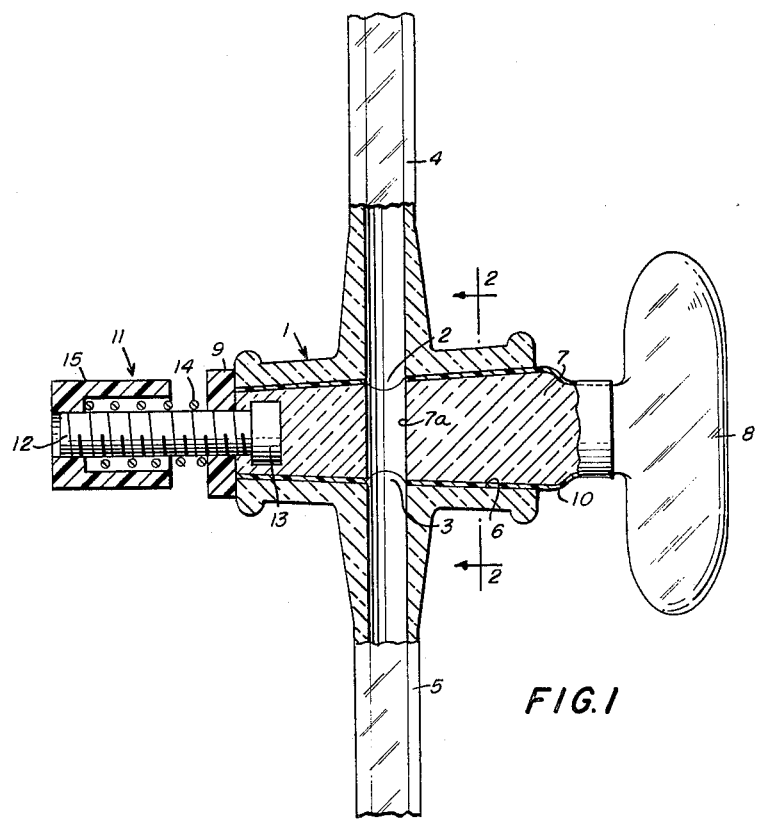

June 11, 1963  C. M. DE WOODY  3,093,359

STOPCOCK FOR LABORATORY GLASSWARE AND THE LIKE

Filed Aug. 31, 1959

INVENTOR
CHARLES M. DeWOODY

BY

ATTORNEY

3,093,359
STOPCOCK FOR LABORATORY GLASSWARE AND THE LIKE

Charles M. De Woody, Vineland, N.J., assignor to Ace Glass Incorporated, Vineland, N.J., a corporation of New Jersey
Filed Aug. 31, 1959, Ser. No. 837,222
3 Claims. (Cl. 251—314)

This invention relates to rotary valves or stopcocks such as employed in laboratory glassware wherein a tapered plug is rotatably mounted in a glass valve housing to control the passage of fluids through valve openings or ports. More specifically, the invention consists in new and useful improvements in a rotary valve or stopcock of this nature including a plastic coated glass plug designed for use in combination with a substantially smooth glass barrel formed in the valve housing.

In conventional laboratory glassware, it is customary to employ stopcocks made entirely of glass, including a glass valve plug rotatably supported in a glass valve housing and with glass-to-glass contact between these elements, it has been necessary to employ a lubricant such as Vaseline between the ground glass surfaces of the valve body or housing and of the plug. Unless such a lubricant is used, the plug is inclined to freeze so that rotation thereof is difficult, or leakage is encountered, particularly where gas or thin fluids are being handled.

In the use of stopcocks made entirely of glass, it has been found that the lubricant required often contaminates the materials being worked with and also that such lubricant may be attacked by such materials as caustics which then proceed to attack the glass. In order to avoid these disadvantages, some efforts have been made to develop stopcocks having self-lubricating plugs. For example, I am familiar with one such stopcock wherein a solid plastic tapered valve plug formed of a synthetic resin is employed and rotatably mounted in the bore of a glass valve housing.

While such a plastic-glass combination in a stopcock was self-lubricating and overcame to some extent the disadvantages of the glass-to-glass contact in the earlier designs, it was also subject to certain disadvantages in itself. For example, the most desirable of the solid plastics which could be used, all have much higher coefficients of linear expansion than the glass, which causes "freezing" in the barrel with ordinary changes in laboratory temperature of 10° F. In the case of Teflon (polytetrafluoroethylene), the coefficient increases so rapidly between 68 and 72° F. that this temperature cycle is enough to cause freezing. Normally, a slight spring tension is maintained on the plug to prevent its falling out of the barrel, and unless this tension is relieved, the solid plastic plug is pulled farther into the barrel as it cools. Upon subsequent expansion, the spring tension holds the plug in place and the expansion force is fully exerted on the glass. Sufficient force has been exerted with Teflon to break the barrel.

The commonly used borosilicate glasses have a linear coefficient of expansion of about $3.2 \times 10^{-6}/°$ C., while the plastics are normally as follows:

Teflon—$99.0 \times 10^{-6}/°$ C.
Kel–F—$70.0 \times 10^{-6}/°$ C.—unplasticized.
Polyethylene—$160$–$180 \times 10^{-6}/°$ C.
Polyvinyl chloride—$160 \times 10^{-6}/°$ C.—variable with added plasticizers.

Another disadvantage of solid Teflon, the most desirable of the plastics because of its chemical resistance, and to a somewhat lesser extent with other plastics, is a tendency to "cold flow" and deform into the holes in the valve barrel when the hole is closed, thus causing an out-of-round condition and a tendency to leak.

The usual spring tension apparently does not exert sufficient force to cause cold flow which results in permanent deformation. Elastic deformation, only, seems to be involved. However, with temperature change, the total expansion of a solid plastic plug creates a force sufficient to cause permanent deformation.

On the other hand, the use of a thin uniformly distributed plastic coating according to the present invention, instead of a solid plastic plug, results in an average linear coefficient of expansion, which, while greater than that of the glass alone, eliminates "freezing" and permanent plastic deformation, while permitting full advantage to be derived from lubricity and elastic deformation.

It is an object of the present invention to provide a plastic-glass stopcock which not only overcomes the disadvantages noted in connection with stopcocks of the glass-to-glass contact type, but also those disadvantages which have been discovered in connection with the solid plastic plug used in a glass barrel.

Another object of the invention is to provide a stopcock plug which is self-lubricating and while retaining its basic shape, is provided with a plastic coating which will deform elastically to fit small irregularities in the surface of the glass barrel.

Still another object of the invention is to provide a non-freezing stopcock for vacuum use which has residual lubricity. Vacuum stopcocks have been made entirely of glass and the mating parts lapped together to a surface finish of about 20 micro-inches. A special low vapor pressure grease is applied to the surfaces which may be more viscous than the standard laboratory lubricants. However, the atmospheric pressure on the plug will eventually cause the lubricant to work out as the plug is turned, and in long term use, plugs often become extremely difficult if not impossible to turn without risk of breakage.

Neither solid plastic nor plastic coated plugs can be used without at least a slight amount of lubricant for high vacuum service because the seal is not sufficiently tight. However, solid plastic plugs soon deform and are useless, while plastic coated plugs do not deform and do not become unworkable as the lubricant works out.

A further object of the invention is to provide a self lubricating stopcock including a valve plug formed basically of glass and which may be provided with a thin plastic coating, either permanently affixed to the glass plug or in the form of a removable plastic sleeve.

Still another object of the invention is to provide an improved plug retaining and spring tension means, including a metal screw member integrated with the tapered end of the glass plug, to avoid the likelihood of breakage which prevails with the use of a glass plug having a portion thereof reduced and threaded to form a screw.

With the above and other objects in view which will appear as the description proceeds, the invention consists in the novel features herein set forth, illustrated in the accompanying drawings, and more particularly pointed out in the appended claims.

Figure 2:
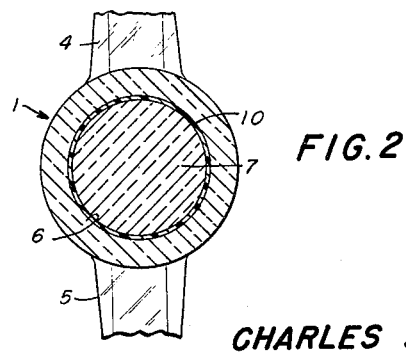

Referring to the drawings in which numerals of like character designate similar parts throughout both views:

FIG. 1 is a longitudinal sectional view through a stopcock formed in accordance with this invention, and FIG. 2 is a transverse sectional view taken on line 2—2 of FIG. 1.

In the drawings, 1 is a glass valve housing having oppositely disposed ports 2 and 3, to which are connected glass tubes 4 and 5. The inner bore 6 of the housing 1 is tapered to accommodate the complementary contour of a tapered glass valve plug 7 having a handle 8 at its enlarged end and preferably a spring-actuated plug retaining assembly 11 at its opposite end, the latter being designed to maintain an effective surface-to-surface contact between the plug and the barrel of the stopcock.

Preferably, the retaining assembly 11 comprises a metal screw member 12 having an enlarged head 13 either embedded in the end of the glass plug 7 or installed in a suitable recess in the end of the plug and cemented therein. A plastic washer 9 fits over the screw 12, abutting the end of the barrel 1 and a coil spring 14 is interposed between this washer 9 and the inner extremity of a recessed nut and spring retainer 15, screw-threaded on the end of the screw 12. Thus, the desired tension may be maintained on the plug 7 in the valve bore 6 to prevent displacement of the valve plug, which is normally slightly shorter than the barrel.

The use of a separate metal screw integrated with the plug 7 provides a far more substantial tension and retaining means than the conventional glass plugs including an integral glass screw member which is subject to breakage not only when in use, but during installation and cleaning.

The tapered periphery of the plug 7 as clearly shown in the drawings, is provided with a relatively thin uniformly distributed coating 10 of a suitable plastic material such as Teflon (polytetrafluoroethylene), Kel–F (chlorotetrafluoroethylene), polyethylene, polypropylene, or polyvinyl chloride formulations, all of which are chemically inert enought to be used in this connection. Teflon in particular, is more inert than the glass or any of the known lubricants.

The plastic coating 10 which may be in the form of an integral sleeve cemented to the periphery of the plug with a cement such as an epoxy-type resin, or applied to the surface of the plug in the form of a dispersion and then baked, provides a plastic-to-glass contact with the attendant self-lubricating advantages. It also provides a plug which, due to the glass foundation of the plug proper, retains its basic shape and at the same time permits a sufficient deformation of the plastic coating 10 to adapt itself to any small irregularities in the taper of the bore 6 of the housing 1.

Preferably, the tapered bore 6 has an R.M.S. surface smoothness of 5 micro-inches or less. The plastic coating is applied to the outer surface of the plug 7, which surface is roughened to 15 micro-inches R.M.S. or more. It will be understood that the plug surface may be less than 15 micro-inches R.M.S. if epoxy cement is used.

For a heat fused resin, a rough surface is required as it is with a force-fit sleeve without cement.

In use, the sleeve or coating 10 maintains an effective gripping engagement with the roughened surface of the plug 7 and engages the smooth surface of the bore 6 to effect an adequate seal, while at the same time providing self-lubrication for the plug 7 for its rotation in the bore 6.

From the foregoing, it is believed that the invention may be readily understood by those skilled in the art without further description, it being borne in mind that numerous changes may be made in the details disclosed, without departing from the spirit of the invention as set forth in the following claims.

I claim:

1. A stopcock for laboratory glassware and the like having a low coefficient of linear expansion, comprising a smooth tapered glass valve barrel, a complementary, tapered glass valve plug and a relatively thin, film-like coating of chemically inert, self-lubricating thermoplastic material uniformly covering the tapered periphery of said glass plug, providing a plastic-to-glass sealing contact with said barrel, said coated plug having an average linear coefficient of expansion which, while greater than that of the glass alone, is considerably less than the linear coefficient of expansion of the material of said thermoplastic coating per se, whereby the self-lubricating qualities of said coating are made fully available without the danger of the "freezing" of the plug or permanent deformation thereof.

2. A stopcock as claimed in claim 1, wherein said valve barrel has an R.M.S. surface smoothness of the order of 5 micro-inches, maximum.

3. A stopcock as claimed in claim 2, wherein the roughness of said plug surface is of the order of R.M.S. 15 micro-inches, minimum.

References Cited in the file of this patent

UNITED STATES PATENTS

| | | |
|---|---|---|
| 668,406 | Holt | Feb. 19, 1901 |
| 2,589,985 | Borneman | Mar. 18, 1952 |
| 2,756,961 | Pickering | July 31, 1956 |
| 2,776,104 | Sinkler | Jan. 1, 1957 |
| 2,832,563 | Walsh | Apr. 29, 1958 |
| 2,864,579 | Stoltenberg | Dec. 16, 1958 |
| 2,876,985 | Birchall | Mar. 10, 1959 |
| 2,946,606 | Smith | July 26, 1960 |
| 2,973,183 | Alger | Feb. 28, 1961 |